Dec. 17, 1940.  W. R. KELLETT ET AL  2,225,435
PAPER MAKING MACHINE
Filed Aug. 6, 1936   14 Sheets-Sheet 1

Inventors:
William R. Kellett
Harry M. Ostertag.
By Fisher, Clapp, Soans & Pond, Att'ys.

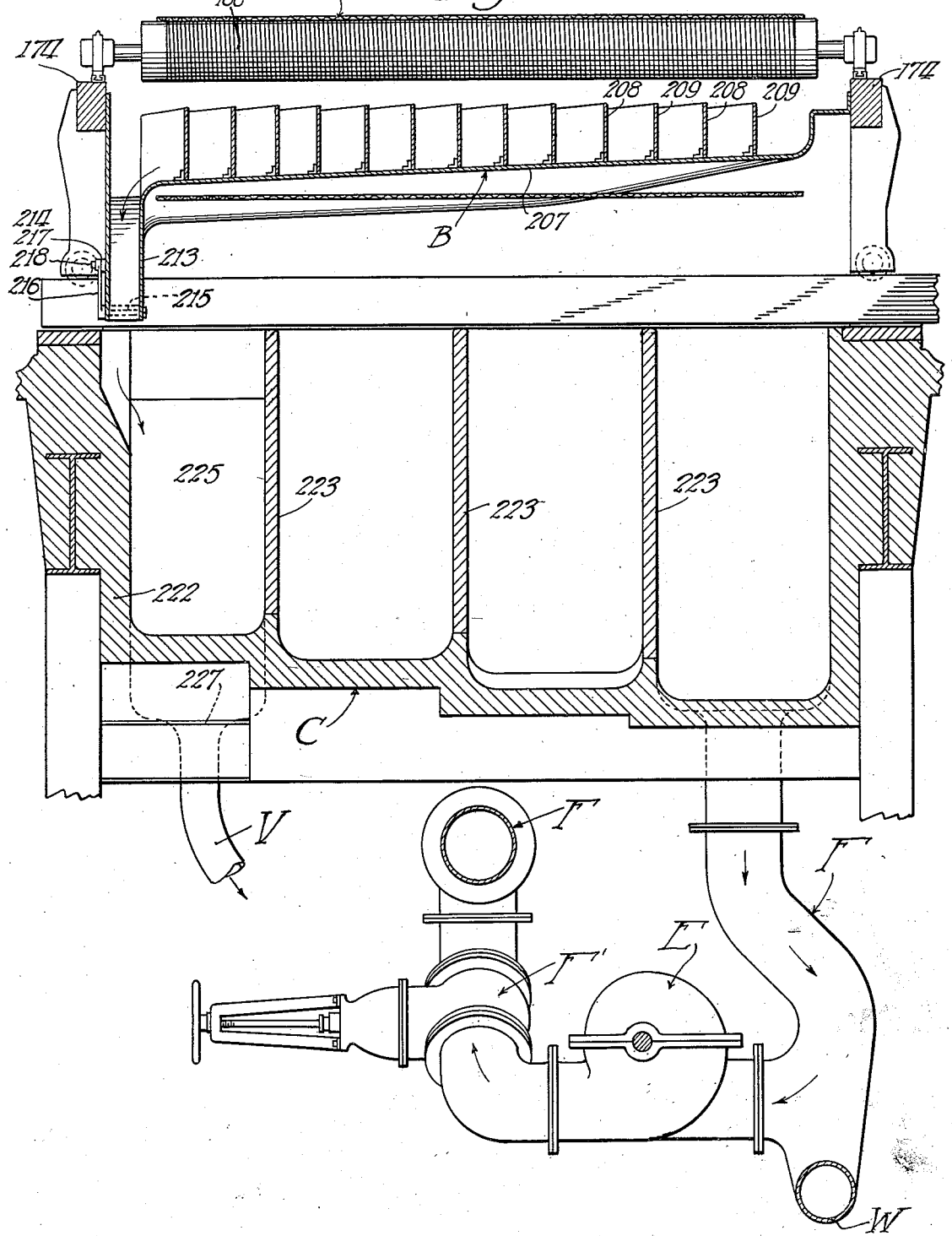

Dec. 17, 1940. W. R. KELLETT ET AL 2,225,435
PAPER MAKING MACHINE
Filed Aug. 6, 1936 14 Sheets-Sheet 3
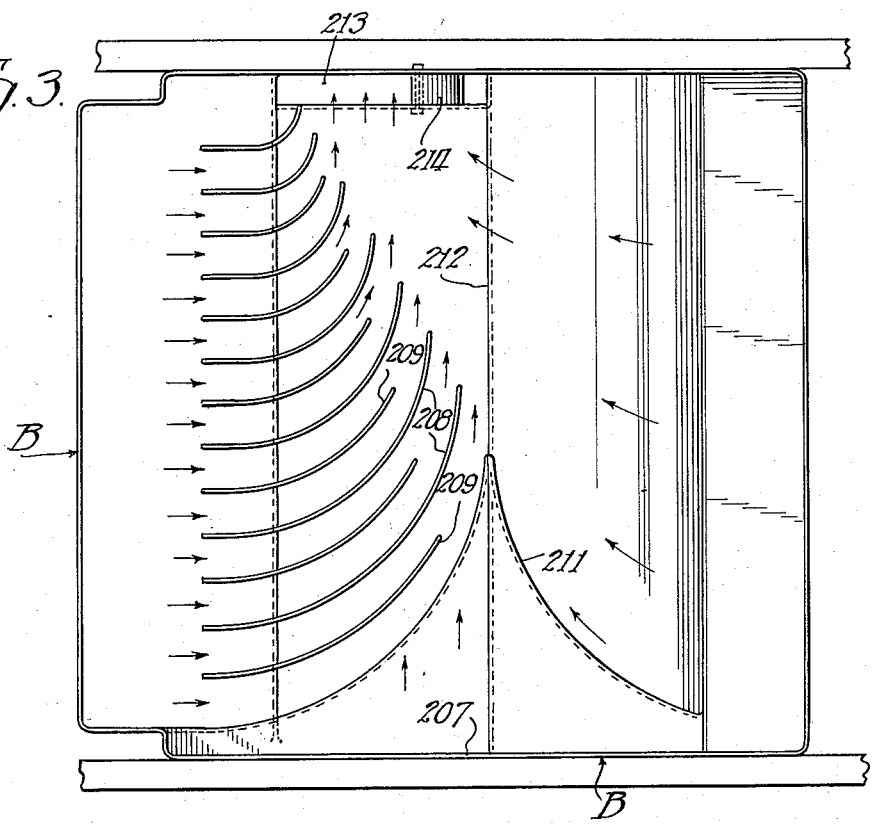
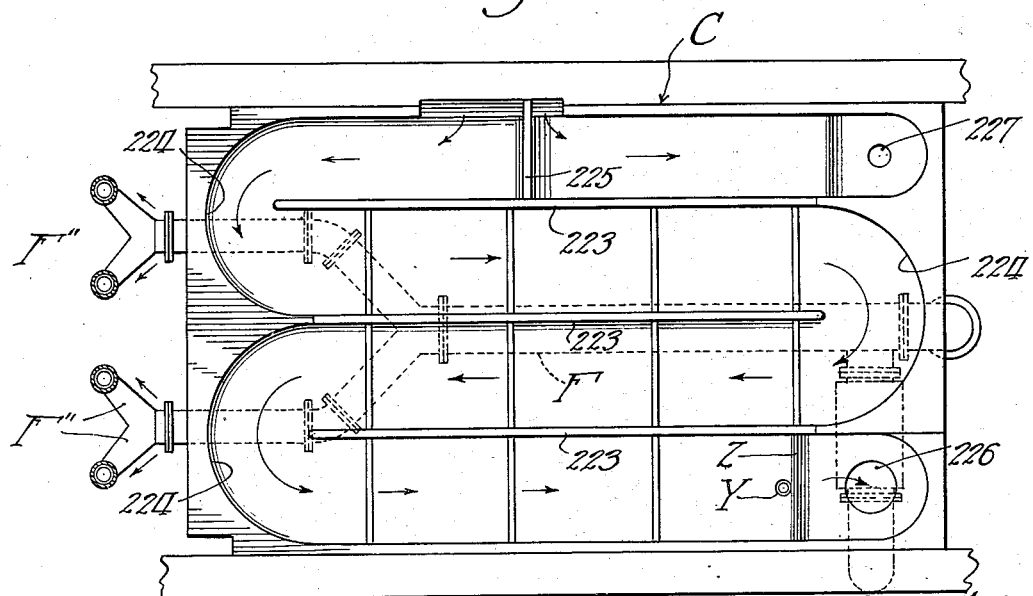
Inventors:
William R. Kellett
Harry M. Ostertag
By Fisher, Clapp, Soans + Pond, Attys

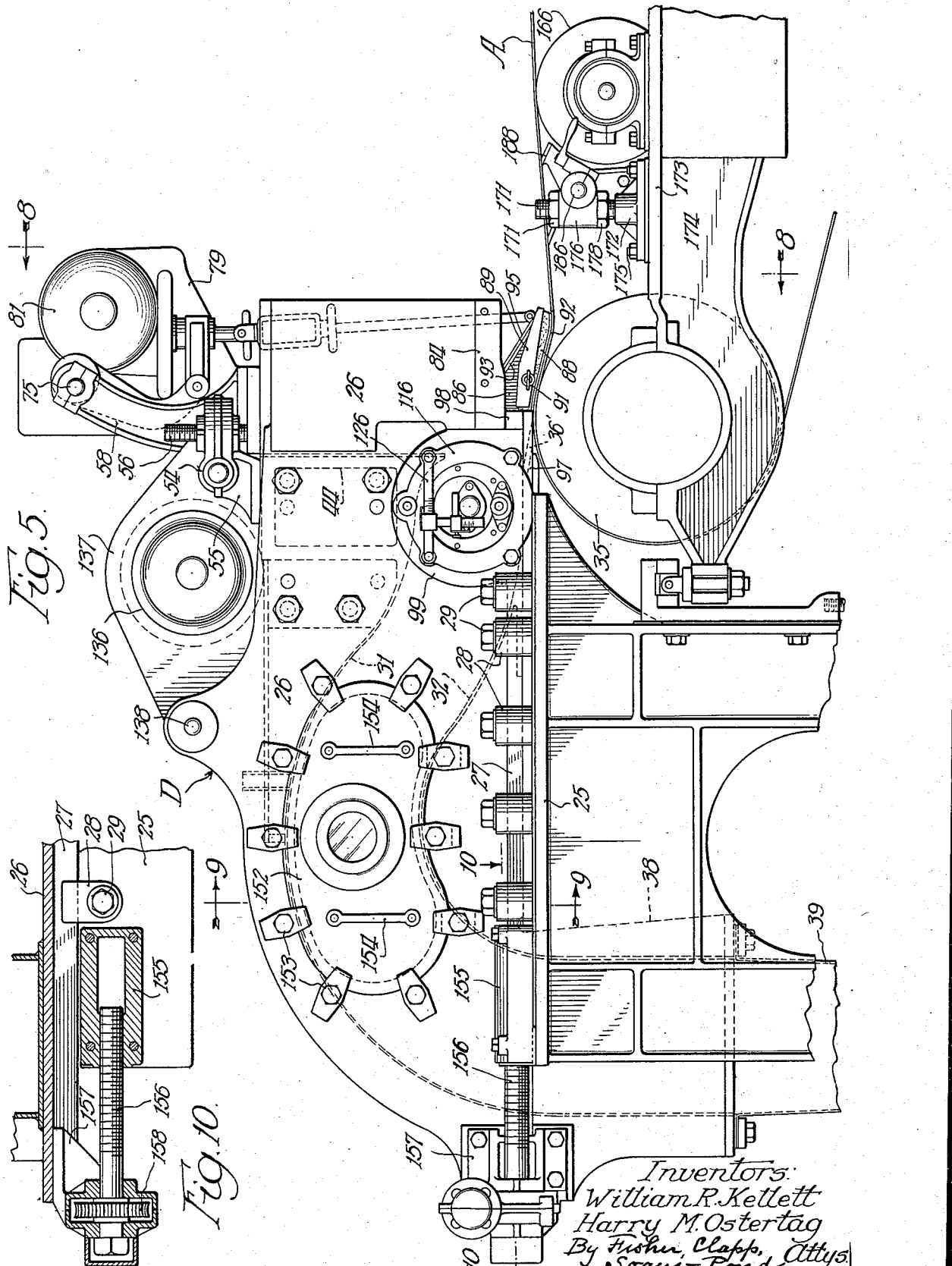

Dec. 17, 1940.  W. R. KELLETT ET AL  2,225,435
PAPER MAKING MACHINE
Filed Aug. 6, 1936   14 Sheets-Sheet 5

Inventors:
William R. Kellett
Harry M. Ostertag
By Fisher, Clapp, Soans + Pond, Attys

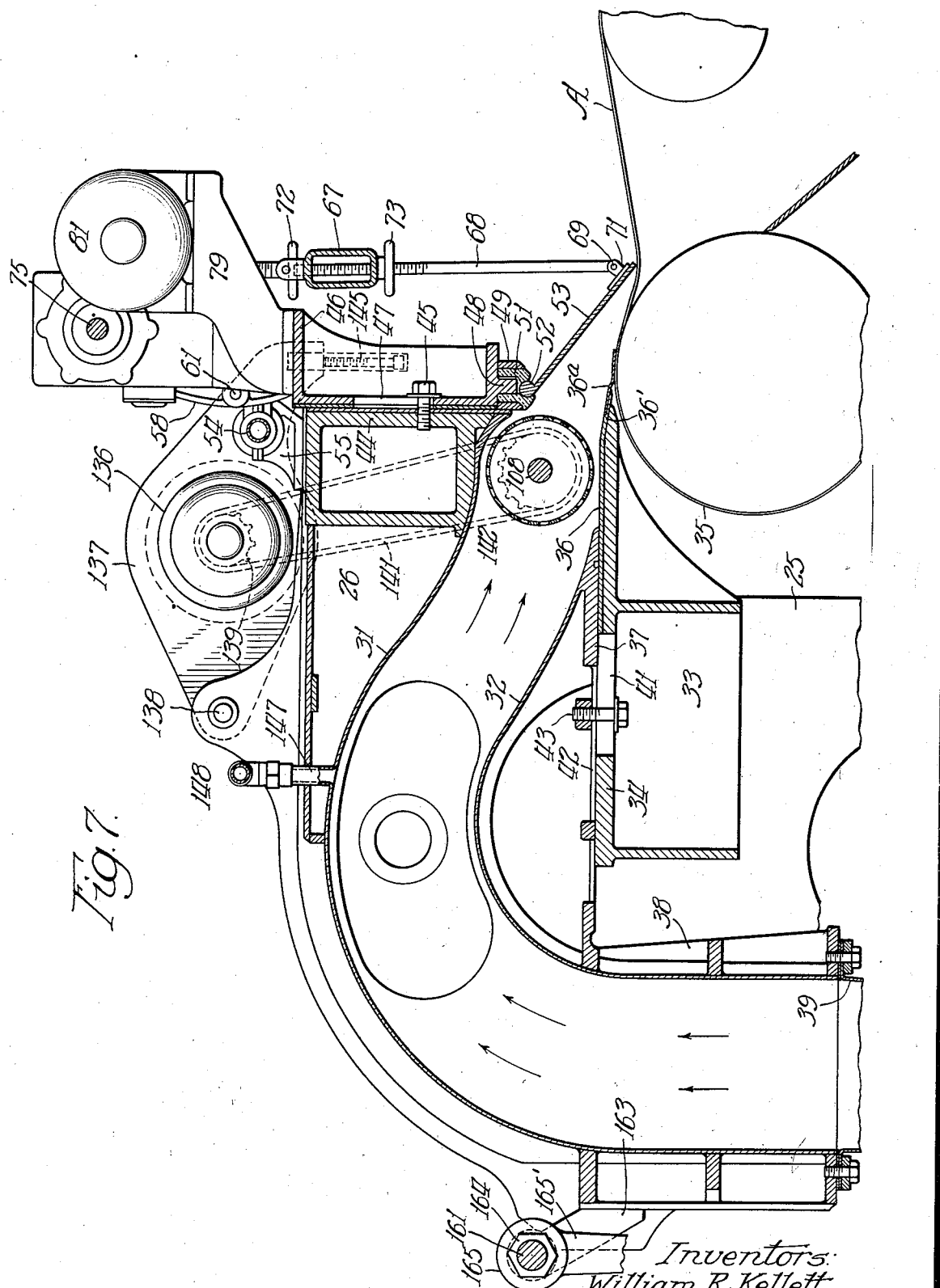

Dec. 17, 1940.   W. R. KELLETT ET AL   2,225,435
PAPER MAKING MACHINE
Filed Aug. 6, 1936   14 Sheets-Sheet 7
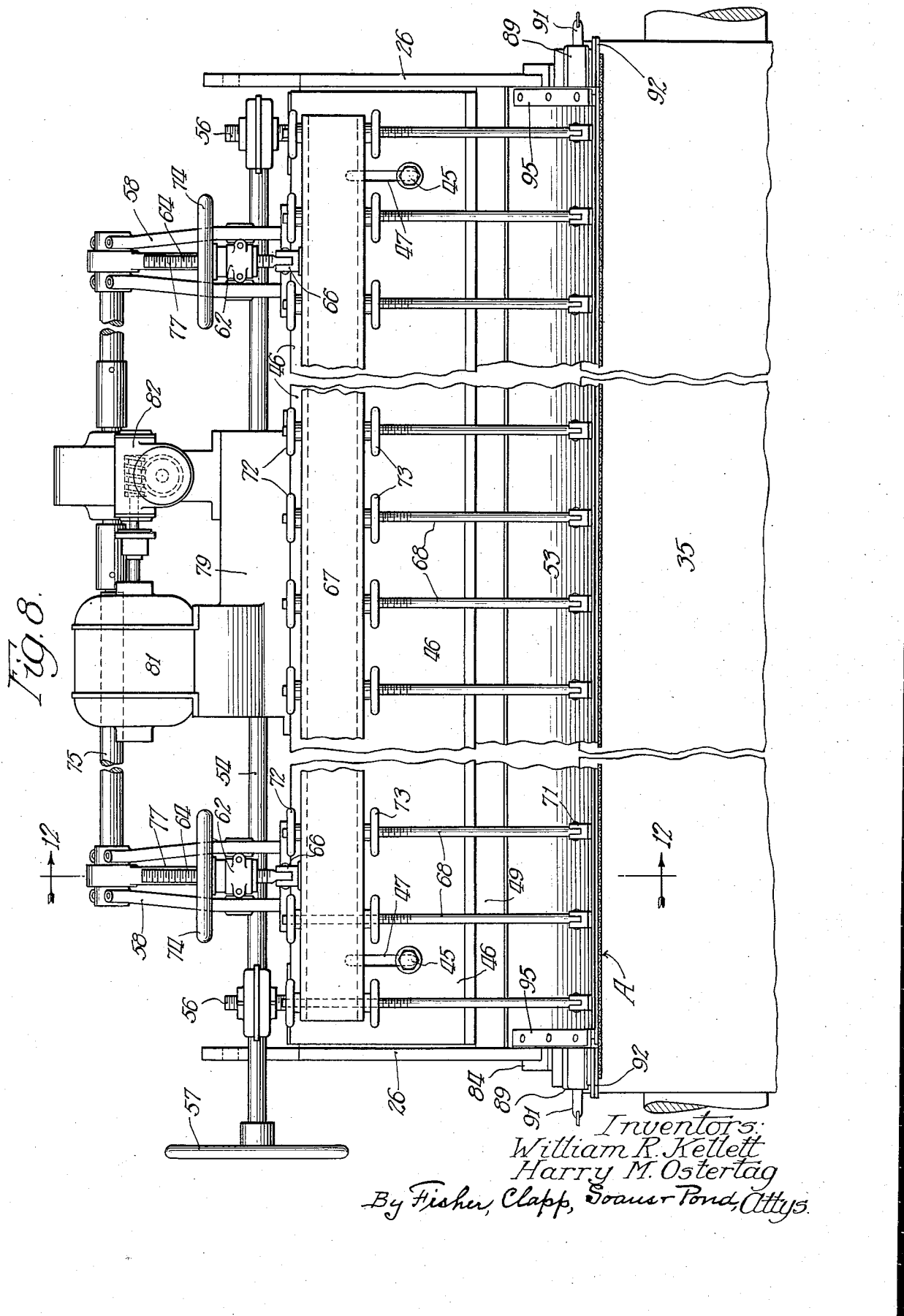
Inventors:
William R. Kellett
Harry M. Ostertag
By Fisher, Clapp, Soans & Pond, Attys.

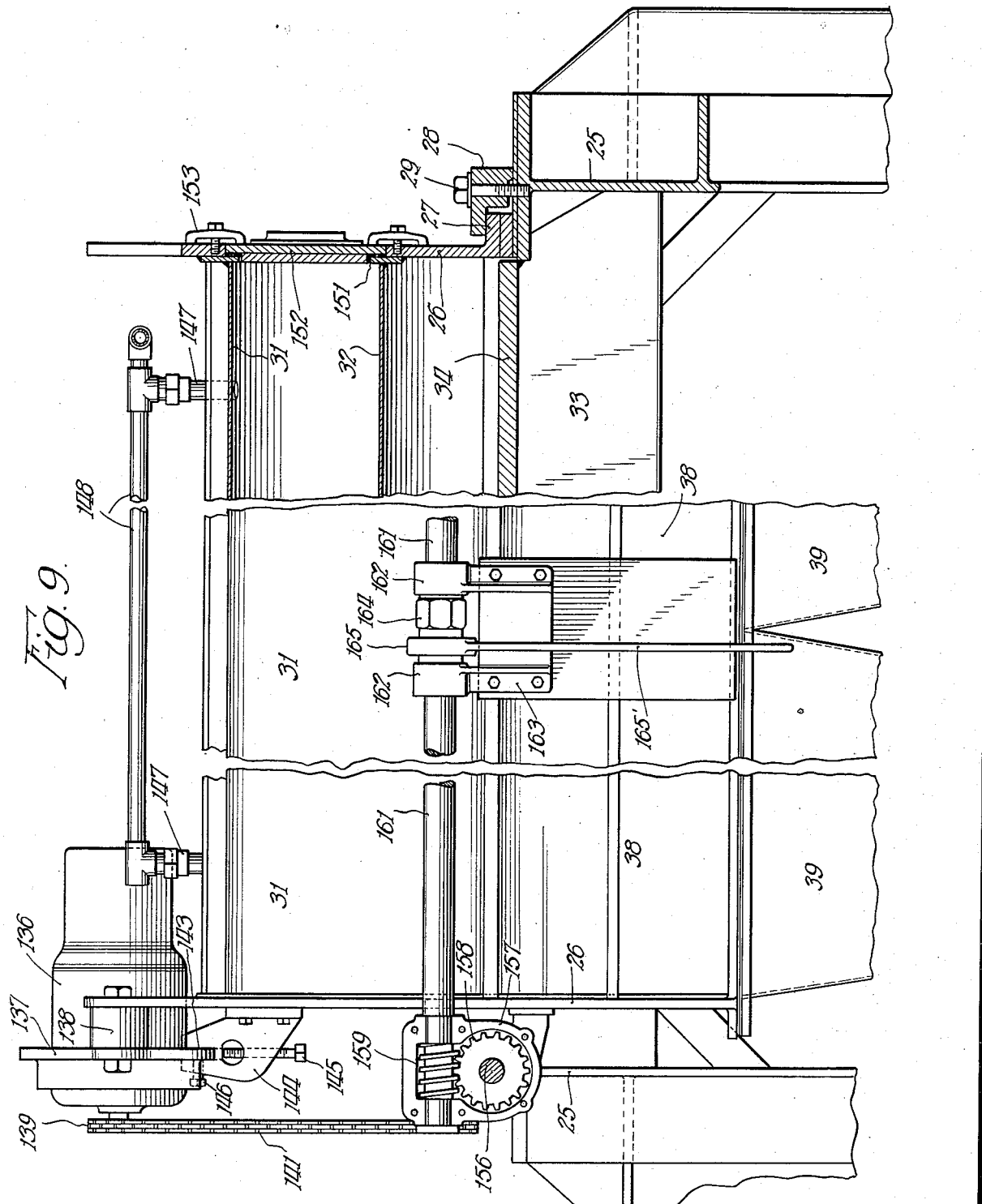

Dec. 17, 1940.  W. R. KELLETT ET AL  2,225,435
PAPER MAKING MACHINE
Filed Aug. 6, 1936  14 Sheets-Sheet 9

Inventors:
William R. Kellett
Harry M. Ostertag
By Fisher, Clapp, Soans & Pond, Attys.

Dec. 17, 1940.     W. R. KELLETT ET AL     2,225,435
PAPER MAKING MACHINE
Filed Aug. 6, 1936     14 Sheets-Sheet 10

Inventors:
William R. Kellett
Harry M. Ostertag
By Fisher, Clapp, Soans + Pond, Attys Dec. 17, 1940.  W. R. KELLETT ET AL  2,225,435
PAPER MAKING MACHINE
Filed Aug. 6, 1936  14 Sheets-Sheet 11
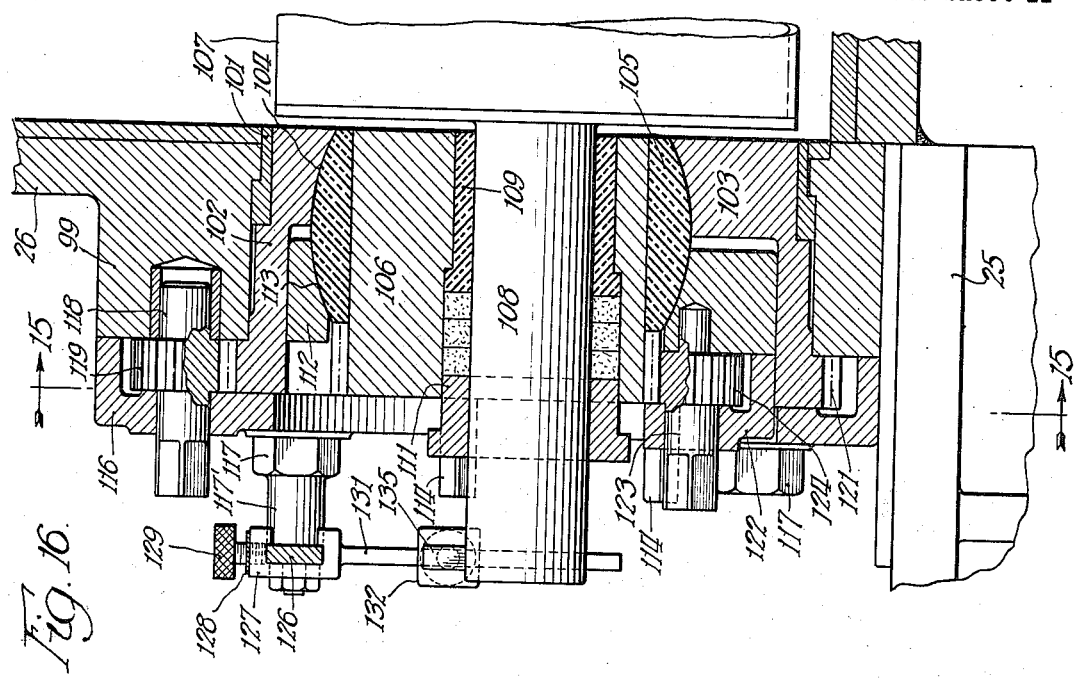
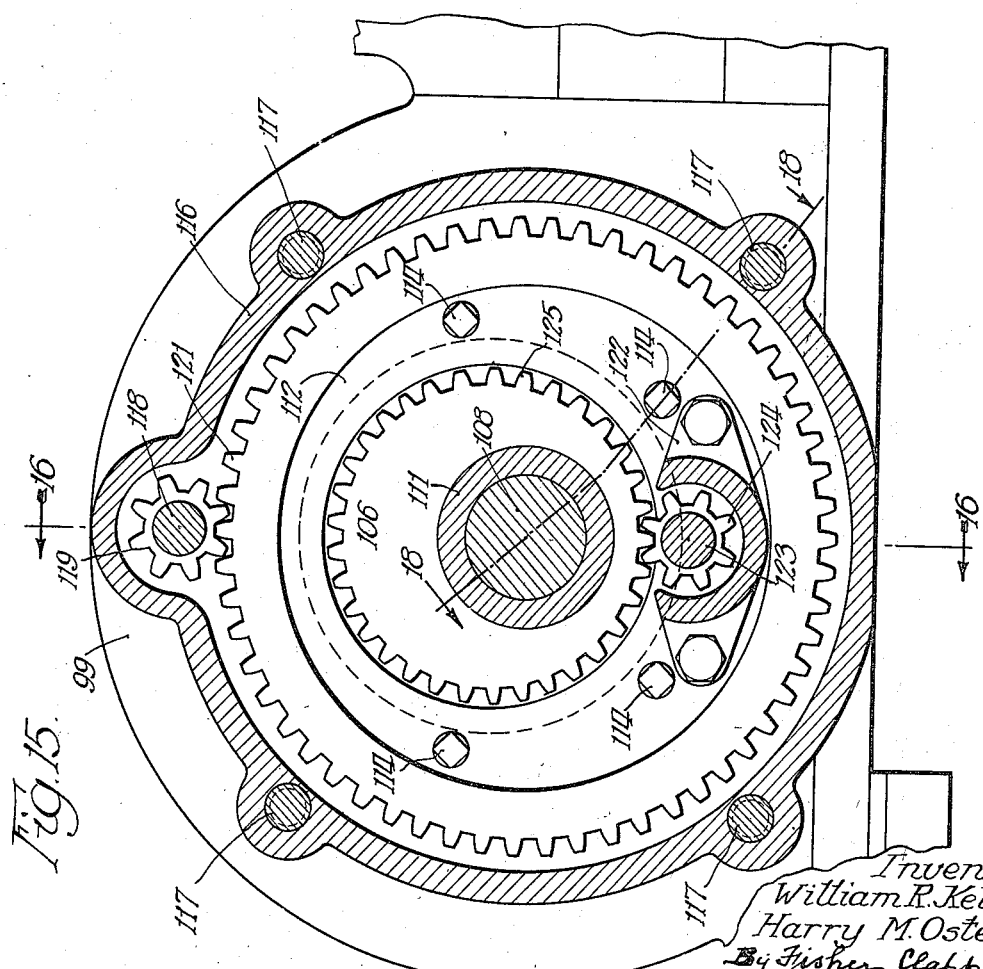
Inventors:
William R. Kellett
Harry M. Ostertag
By Fisher, Clapp,
Soans & Pond Attys.

Dec. 17, 1940.   W. R. KELLETT ET AL   2,225,435
PAPER MAKING MACHINE
Filed Aug. 6, 1936   14 Sheets-Sheet 12
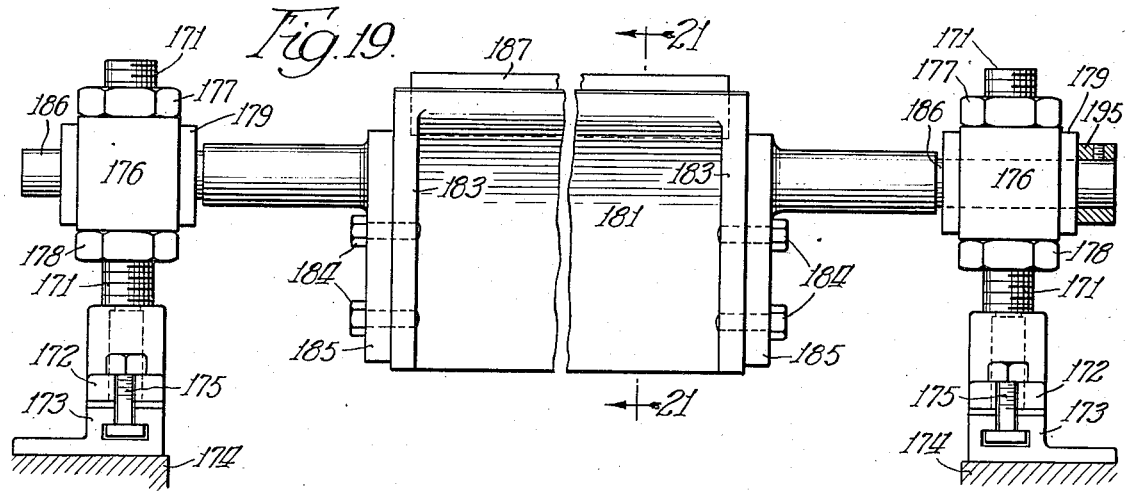
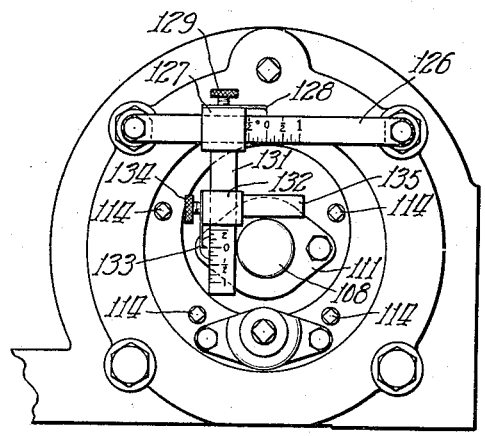
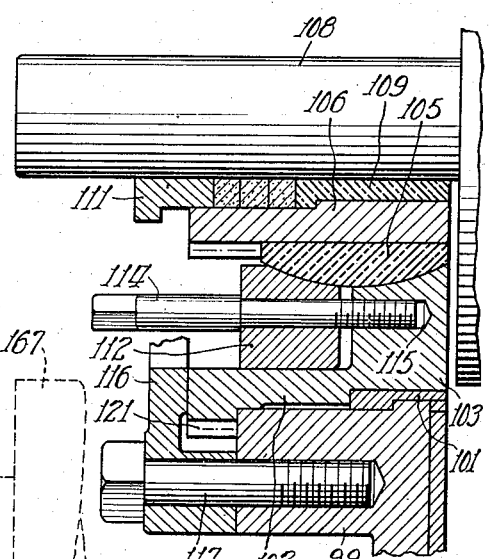
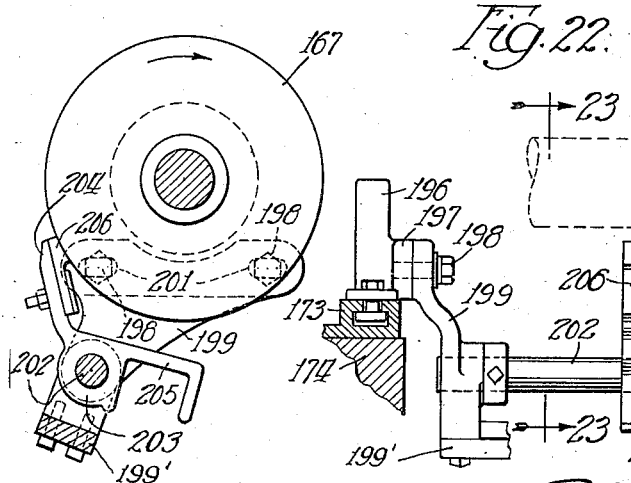
Inventors:
William R. Kellett
Harry M. Ostertag
By Fisher, Clapp, Soans & Pond, Attys Dec. 17, 1940.  W. R. KELLETT ET AL  2,225,435
PAPER MAKING MACHINE
Filed Aug. 6, 1936  14 Sheets-Sheet 13
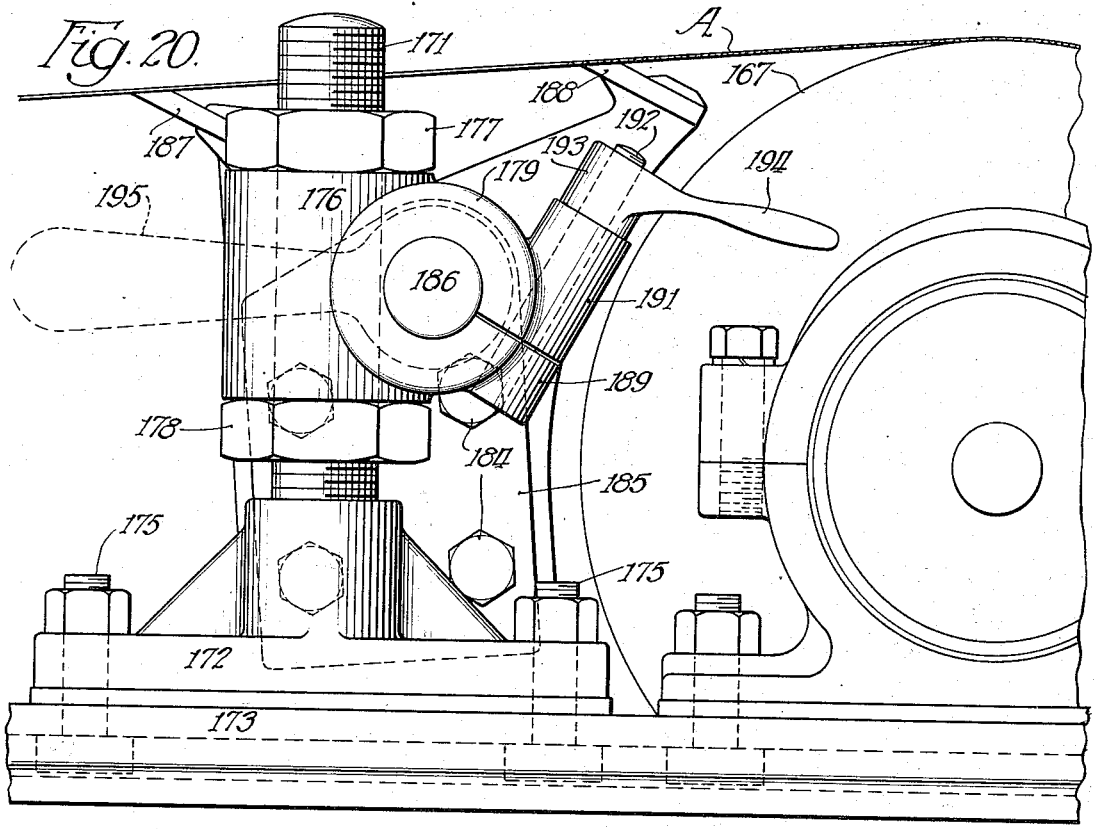
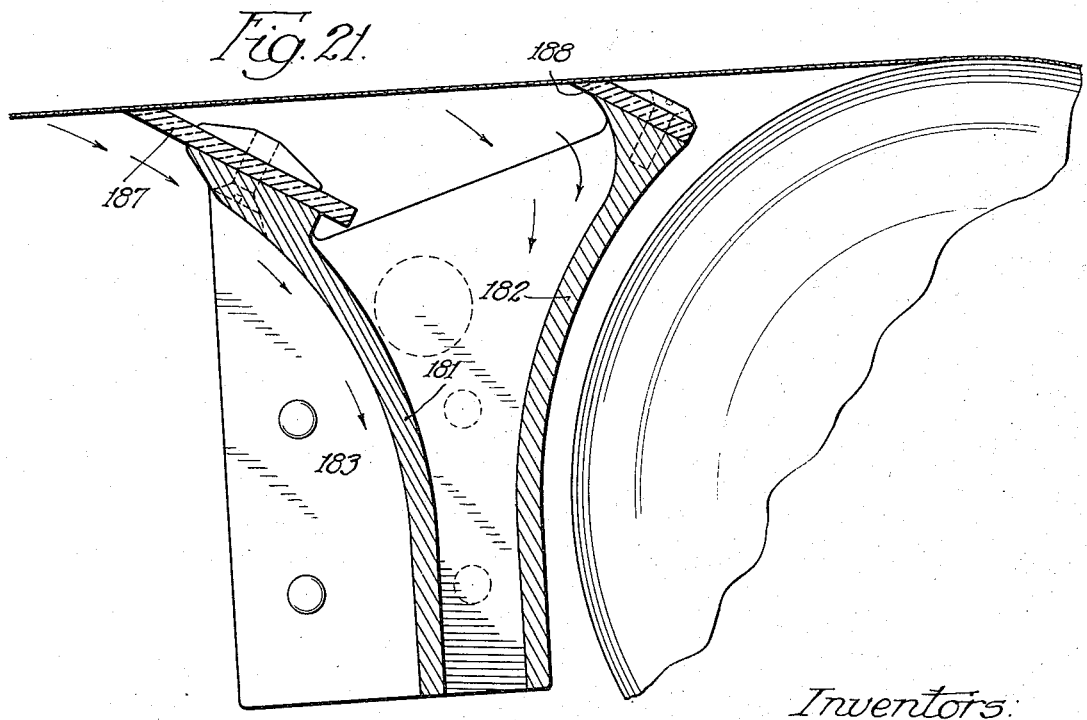
Inventors:
William R. Kellett
Harry M. Ostertag
By Fisher, Clapp, Soans & Pond, Attys.

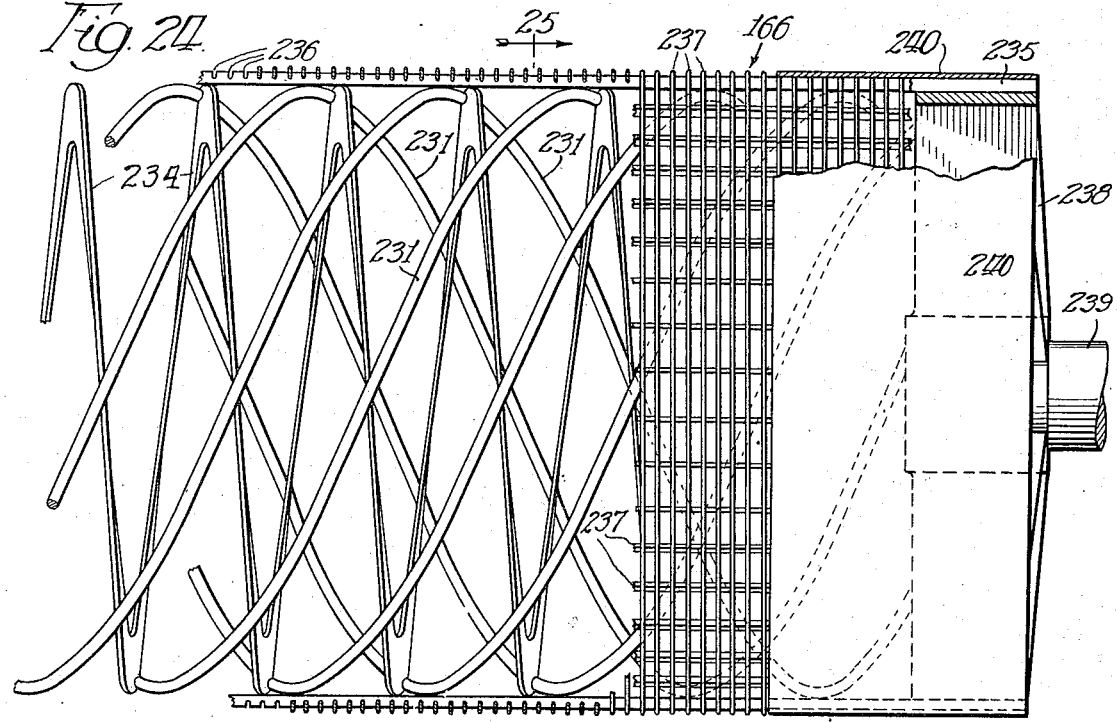
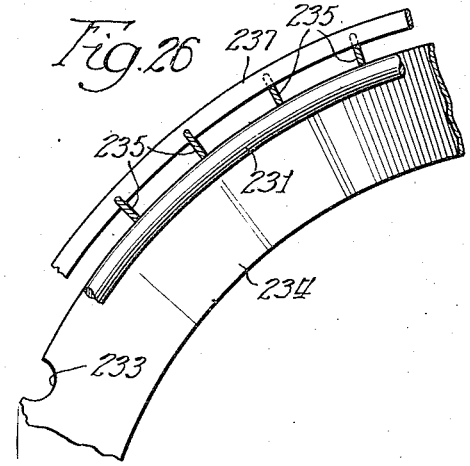
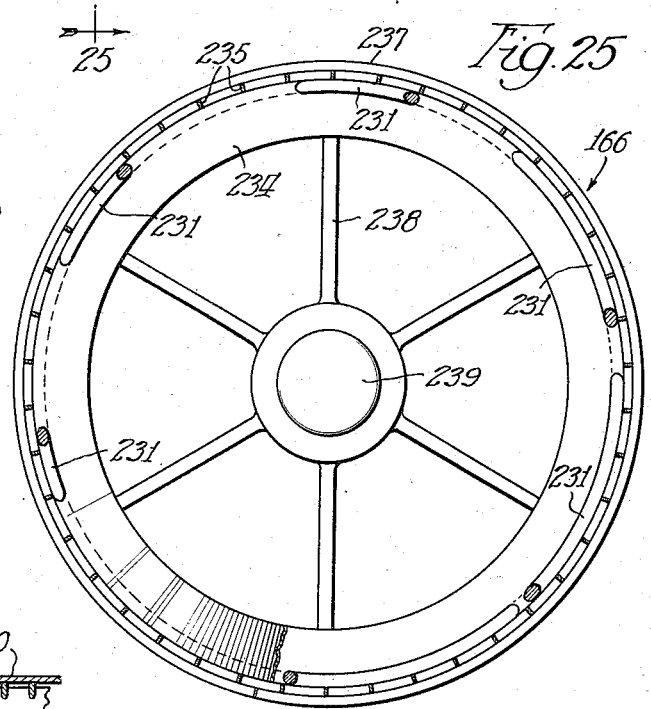
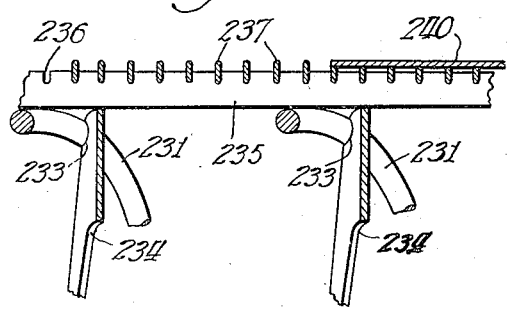

Patented Dec. 17, 1940

2,225,435

UNITED STATES PATENT OFFICE 2,225,435

PAPER MAKING MACHINE

William R. Kellett, Menasha, and Harry M. Ostertag, Neenah, Wis., assignors to Paper Patents Company, Neenah, Wis., a corporation of Wisconsin Application August 6, 1936, Serial No. 94,516

14 Claims. (Cl. 92—44)

This invention relates to paper making machines employing traveling screens of the Fourdrinier type, and more specifically to machines employing a type of inlet wherein the stock is pumped directly from the mixing box to the inlet through a closed top spout adapted to be completely filled with a flowing charge of stock and having a delivery mouth, in lieu of the more usual intervening open head box. An inlet employing a closed top spout without any intervening head box is disclosed in Figs. 14 and 15 of Letters Patent No. 2,060,808 dated November 17, 1936, and one important object of this invention has been to provide an improved stock inlet of this type.

According to the present invention the entire stock inlet, with the exception of the bottom lip, is adjustable in a horizontal plane. This permits the inlet to be shoved out over the wire or over the breast roll so as to vary, as desired, the area of the wire at which the stock is disharged onto the latter. The flow passage or duct of the stock inlet in our present invention preferably has a goose-neck form, and to facilitate the adjustment in a horizontal plane, the goose-neck duct is preferably connected with the main supply pipe by one or more flexible pipe connections, which simplify the engineering design and eliminate unnecessary sliding joints which must be maintained water tight.

Other important objects of the invention are, to provide an inlet wherein the cross section is so designed that there are no hydraulic dead areas present where stock can clog or settle out, and which will also provide for a high velocity through the inlet; to provide an improved construction of inlet which permits the top nozzle plate to be extended considerably beyond the center line of the breast roll and beyond the lower nozzle plate and/or apron—a feature which enables the stock to be furnished to the paper machine at a very low consistency, as low as $\frac{1}{10}$ of 1 percent, and at the same time permits the major portion of this enormous amount of water to be removed before the stock emerges from the inlet, which enables us to obtain a superior sheet formation and adequate water removal without the use of an unduly long wire; to provide improved sealing devices for the ends of the upper nozzle plate, which will function satisfactorily under the considerable sag of the wire between the breast roll and the first supporting roll that results from the high pressure of the stock against the wire; to provide a quick means for raising the top nozzle plate to prevent injuring the wire when the stock is shut off and the hydraulic pressure relieved, and to prevent injury to the top lip from the drag of the wire upon it; to provide an improved form of bottom nozzle plate whereby it may be brought as close as possible to the center line of the breast roll and deliver the stock tangent to the latter and at the same time have sufficient strength for the span across the machine; to provide an improved pivot joint for the movable top nozzle plate that will prevent leakage and "freezing" of the joint, while permitting easy angular adjustment; and to provide an improved arrangement of the table rolls relatively to each other and to the breast roll, whereby the greatest amount of water will be removed before the stock emerges from the inlet.

Still other objects and attendant advantages of the invention will be apparent to engineers and others familiar with the paper making art from the following description, taken in connection with the accompanying drawings in which we have illustrated a paper making machine of the Fourdrinier type in which are embodied the several improved features hereinabove enumerated, wherein—

Fig. 2 is an enlarged vertical cross section through the machine taken on the line 2—2 of Fig. 1.

Fig. 3 is a plan view of the drain tray that underlies the Fourdrinier wire.

Fig. 4 is a plan section on the line 4—4 of Fig. 1 illustrating the mixing tank formation.

Fig. 5 is an enlarged side elevation of the stock inlet and the breast roll and first table roll and the Fourdrinier wire associated therewith.

Fig. 7 is an enlarged vertical longitudinal section on the line 7—7 of Fig. 6.

Fig. 8 is a front elevation of the inlet, broken out, viewed on line 8—8 of Fig. 5.

Fig. 9 is a rear elevation of the inlet, broken out and partly in vertical section on line 9—9 of Fig. 5.

Fig. 10 is a horizontal section through the inlet-adjusting device, on the line 10—10 of Fig. 5.

Fig. 15 is a vertical transverse section through the distributing roll adjusting mechanism on line 15—15 of Fig. 16.

Fig. 16 is a vertical longitudinal section through the same mechanism on line 16—16 of Fig. 15 in a plane at right angles to the sectional plane of Fig. 15.

Fig. 17 is a front elevation of the distributing roll adjusting mechanism shown in Figs. 15 and 16.

Fig. 18 is a sectional view through the distributor roll adjusting mechanism taken on the line 18—18 of Fig. 15.

Fig. 19 is an elevation of a water doctor for the under side of the Fourdrinier wire, as viewed on line 19—19 of Fig. 1.

Fig. 20 is an enlarged side elevation of the same.

Fig. 21 is an enlarged vertical section on line 21—21 of Fig. 19.

Fig. 22 is a fragmentary elevation of a water doctor or wiper for a high speed driven table roll.

Fig. 23 is a vertical section of the same on the line 23—23 of Fig. 22.

Fig. 24 is a plan view partly in horizontal section and broken out, of one of the open-surface wire table rolls.

Fig. 25 is a vertical transverse section of the same on the line 25—25 of Fig. 24.

Fig. 26 is an enlarged fragmentary cross section of the peripheral portion of the roll.

Fig. 27 is an enlarged fragmentary longitudinal section of the peripheral portion of the roll.

*General organization*

Figure 1:
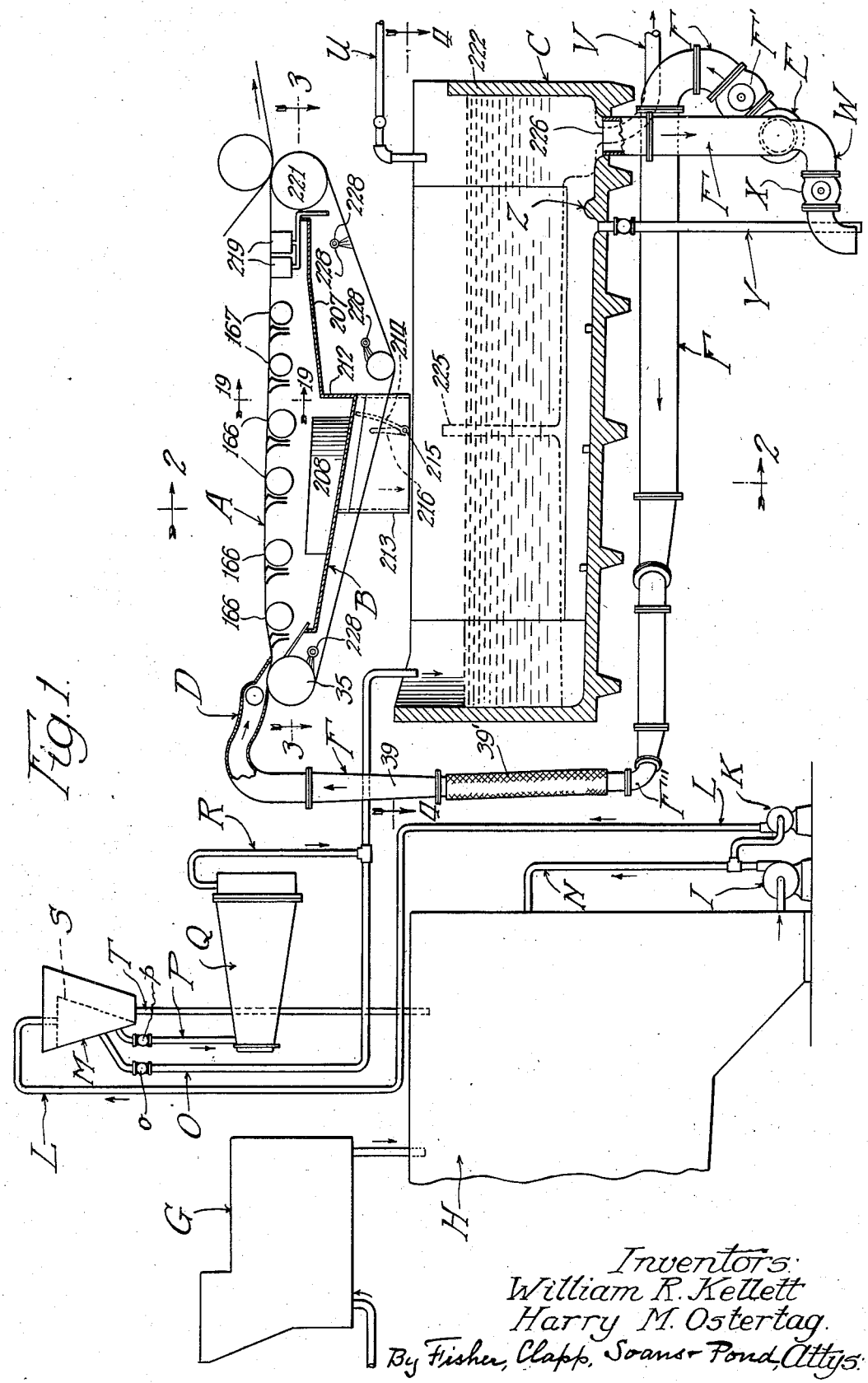
Fig. 1 is a schematic view partly in side elevation and partly in vertical section of our improved machine and accessory devices illustrating the sources of stock supply and direction of flow of the stock.

Fig. 1 of the drawings shows diagrammatically the machine proper and a number of accessory devices that are preferably employed therewith. A designates as an entirety the usual Fourdrinier wire, B a tray underlying the wire, and C a mixing tank underlying the tray B. This mixing tank C is normally nearly filled with water that has passed through the wire A and out of the tray B, and this water, with fresh stock added thereto, is sent back to the inlet nozzle D by a circulating pump E in a flow line F, having a flow-regulating valve F'' on the discharge side of the pump. Fresh stock from the beater chest passes into a De Zurik consistency regulator G, whence the stock flows into a machine chest H. From the machine chest H the stock is moved by a pump K through a pipe line L, to a head-regulating cone S within a cone M. A pump I in a pipe N maintains a circulation of stock in the chest H; and for convenience the intake of pump K may be connected to the circulation pipe N as shown. From the cone S stock flows through a pipe O having an orifice control indicated at o into one end of the mixing tank C under a constant head maintained by the cone S. The overflow from cone S into cone M returns through a pipe T to the chest H. A portion of the stock in the stuff cone S may also be sent through a pipe P having an orifice control indicated at p to a Jordan engine Q from which it is delivered to the pipe O through a pipe R.

At the opposite end of the mixing tank C is a valve-controlled pipe U through which fresh water may be added to the body of stock in the tank as required to maintain a constant level in the tank C. As will be later explained, the flow passage in the tank C is divided, and a minor portion of the stock in the tank is sent through a pipe line V, to sprays later described. Tapping the main flow line F is a branch pipe line W leading to a sump and normally closed by a valve X. Also connected at the bottom of the tank C is a waste line Y directly in front of a low dam Z extending across the flow passage of the tank, by which dirt or other sediment collecting in front of the dam may be drained off.

*Bodily adjustable inlet*

The structural features of the inlet are shown mainly in Figs. 5 to 14 inclusive. A pair of stationary side frames 25 support on their top horizontal edges a pair of vertical walls 26 formed on their lower edges with flanges 27 by which they are rigidly secured on the side frames 25 by means of clamps 28 and clamp screws 29. Secured in a liquid tight manner, as by welding, to and between the walls 26 are curved upper and lower plates 31 and 32 that, with the side walls 26, form a closed spout of a generally goose-neck form. The cross section of this spout has been so designed that there are no hydraulic dead areas present where stock can clog or settle out. The design also provides for a high velocity flow through the inlet for the same reason. The interior of the spout is preferably made of stainless steel because scum, pitch, and other objectionable substances do not readily adhere to it. The result of this improvement is that the interior of the spout remains perfectly clean throughout a run.

Extending between and connecting the side frames 25 is a cross beam 33 (Fig. 7) formed with an integral top plate 34, the forward portion of which partly overhangs the breast roll 35. Secured to this forward portion of plate 34 is the stationary bottom lip or nozzle plate 36 of the spout, the forward portion 36' of which lip is inclined downwardly slightly and extends approximately to the center line of the breast roll so as to deliver the stock tangent to the latter. Overlying the forward portion of the lip is an oilcloth apron 36ª, the forward free edge of which overlies the wire at substantially the center line of the breast roll. Slidable on the top plate 34 and the rear portion of the bottom nozzle-plate 36 is a plate 37, to the forward edge of which the forward edge of the lower spout plate 32 is secured. Secured to and continuous with the rear portion of plate 37 is a depending frame structure 38 lying between and secured to depending portions of the side walls 26; the frame structure 38 constituting a holder and stiffener for the depending portion of the spout, as clearly shown in Figs. 5 and 7. To the lower end of the frame 38 are connected by water-tight joints a plurality of copper duck bills 39 (Fig. 9) that register with the lower end of the spout, and to these duck bills are connected flexible hose sections 39' that are similarly connected at their lower ends to branches F''' (Figs. 1 and 4) of the underlying flow line F and form flexible parts of said flow line. The plates 34 and 37 are formed with registering slots 41 and 42 respectively, through which extends a clamp bolt 43.

Figure 12:
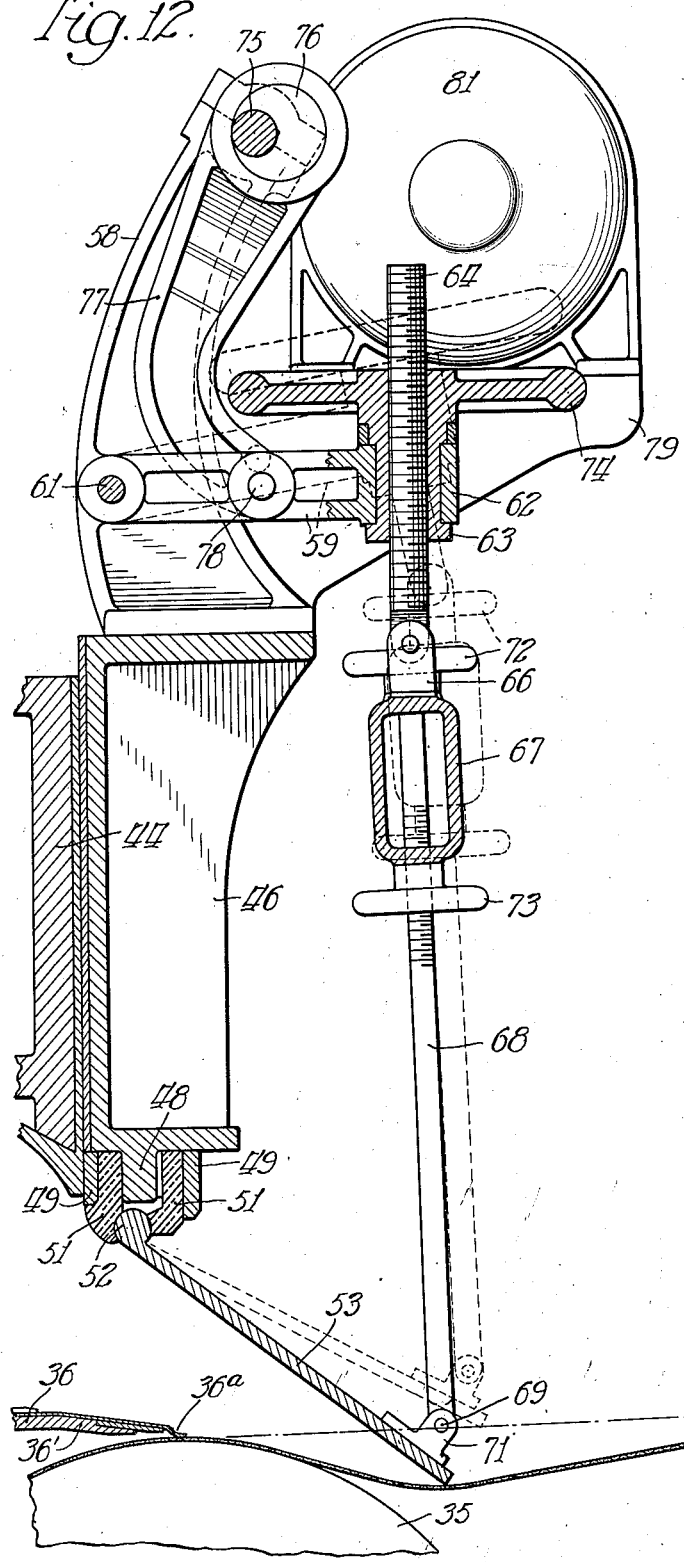
Fig. 12 is a vertical section of the same on line 12—12 of Fig. 8.

Secured to and extending between the side walls 26 is a hollow beam 44 (Fig. 7), to the lower side of which the forward terminal portion of the upper spout wall 31 is welded or otherwise secured. To the front wall of the beam 44 is attached, by screw bolts 45, a vertically adjustable bracket 46, the screw bolts 45 extending through slots 47 in the transverse vertical wall of the bracket. Referring to Fig. 12, on the lower edge of bracket 46 is a rib 48, to opposite sides of which are secured, as by clamp strips 49, a pair of fiber strips 51 that extend below the rib 48 and are formed in their opposed faces with bearings for the brass pintle rod 52 of the brass upper nozzle plate 53. One of the difficulties heretofore experienced with a hinged top nozzle plate (particularly where the inlet is operated under high pressure) is that the joint is usually made with a brass-to-brass contact, and in order to prevent leakage it is necessary to screw this so tight that the metal joint "freezes" and can then be readjusted only with great difficulty. We have overcome this difficulty by providing this fiber bearing for the nozzle plate pivot. The product sold under the trade name "Micarta" is particularly satisfactory for the bearing strips 51, this material comprising a molded admixture of fiber and a synthetic resin binder such as phenol-formaldehyde or urea formaldehyde, but other non-metallic bearing materials, such as hard rubber or various of the other synthetic resin-fiber products may be used. We have found by experience that the bottom free edge of the top nozzle plate or slice should be a sharp line. We preferably use a chromium-plated square or 90 degree edge, as indicated in Fig. 12, since we have found that if a soft material is used, and becomes at all rounded, the formation of the mat on the wire is very seriously injured. Experience indicates that the best results are obtained with the top nozzle plate extended considerably beyond the center line of the breast roll and beyond the lower nozzle plate, so as to expose a portion of the wire to the full pressure of the stock. This removes the major portion of the water before the wire passes beneath the slice and permits the use of stock of a very low consistency, and hence improves the formation. Under these conditions the slice opening may be only a small fraction of that ordinarily used, so that subsequent drainage through the mat is reduced to a minimum and the length of the wire may be correspondingly reduced.

Figure 6:
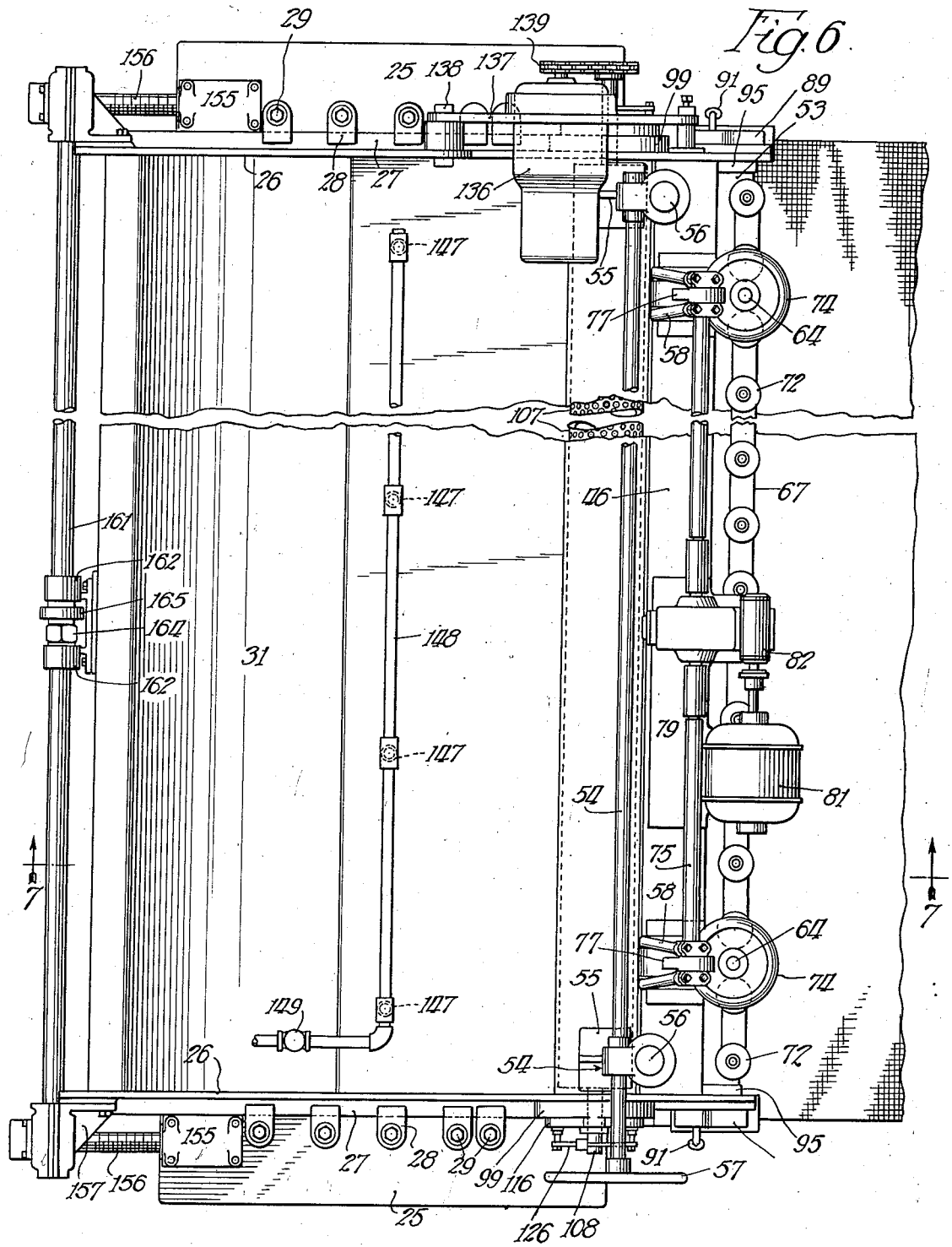
Fig. 6 is a top plan view of the parts shown in Fig. 5.

The bracket 46, to the lower end of which the top nozzle plate 53 is pivoted, may be adjusted vertically, after the clamp bolts 45 have been released, by a mechanism fully described and shown in Figs. 4, 8 and 9 of our former Patent No. 2,060,808, above referred to. This adjusting mechanism is indicated in Figs. 5, 6, and 7, wherein 54 designates a cross shaft journaled in a pair of brackets 55 mounted on the beam 44, said shaft carrying spiral gears that mesh with internally threaded spiral gears journaled in and confined against up and down movement by housings carried by the brackets 55. These spiral gears are internally threaded to engage with screw threaded rods 56, the lower ends of which are fixed in sockets in the top wall of the bracket 46. On one end of the shaft 54 is a hand wheel 57, by turning which the bracket 46 is bodily raised and lowered to the desired extent.

*Top nozzle plate adjusting mechanism*

The top nozzle plate 53 is equipped with manually operated means for adjusting its free edge toward and from the Fourdrinier wire, and also with a means, preferably power operated, for quickly raising it to prevent injuring the wire when the stock is shut off and the hydraulic pressure relieved. As a result of the fact that the top nozzle plate operates with the lower edge almost in contact with the wire, and this, with the high stock pressure employed (equivalent to approximately a 75 inch head) bends the wire downwardly so that the lower edge of the nozzle plate is below a line tangent to the top of the breast roll and the first table roll, as shown in Figs. 7 and 12, we have found it necessary to provide a quick acting means for raising the top nozzle plate to prevent injuring the wire when the stock is shut off and the hydraulic pressure relieved, with the resultant tendency of the wire to resume the straight line position between these rolls. If the top nozzle plate were not quickly raised, the wire would drag upon it with such a tension as to be injured thereby.

Figure 11:
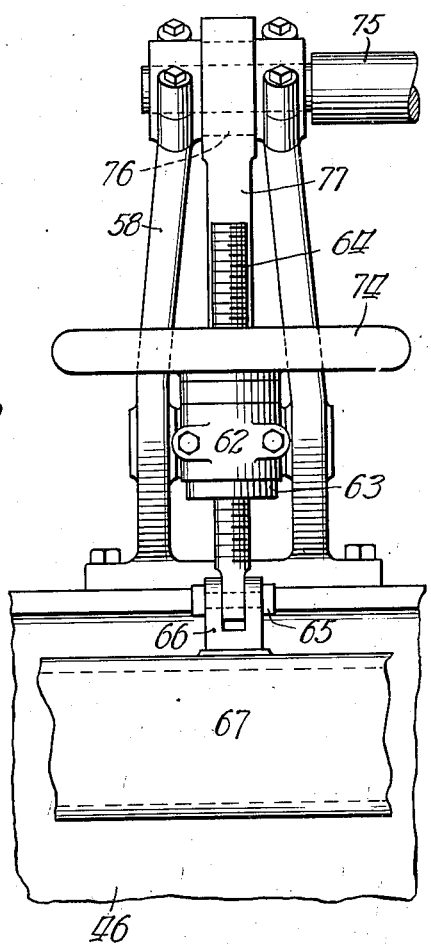
Fig. 11 is a front elevation of the upper nozzle-plate raising mechanism on one side of the machine.

Describing first the manual adjusting means, which closely follows that shown in our former patent above referred to, 58 designates each of a pair of forked brackets that are mounted near the sides of the machine on the top wall of the bracket 46, and 59 designates each of a pair of arms that, as best shown in Figs. 11 and 12, are pivoted at 61 to the brackets 58 and are formed at their free ends with collars 62 that embrace sleeve nuts 63. Extending through each of the sleeve nuts 63 is a threaded rod 64, the lower end of which is pivoted at 65 to a forked lug 66 on the upper edge of a hollow horizontally extending bar 67. Extending crosswise through the bar 67 are a plurality of depending rods 68 (Fig. 8), the lower ends of which are pivoted at 69 to forked lugs 71 on the lower end of the nozzle plate 53. The upper portions of the rods 68 are threaded to receive upper and lower adjusting and clamping nuts 72 and 73, by manipulation of which each rod 68 may be adjusted up or down as required. Fast with each of the sleeve nuts 63 is a hand wheel 74 through which a coarse adjustment is effected by raising or lowering the bar 67. A considerable number of the adjusting rods 68, quite closely spaced, are employed, so that, after the coarse adjustment has been effected as described, fine adjustments may be effected so as to insure a true, straight edge on the nozzle plate 53 by individual manipulation of the adjusting means of the rods 68.

The sleeve nuts 63 are normally held rigid by mechanism constituting part of the quick adjusting means, which will next be described.

Referring to Figs. 5, 6, 7, 8, 11 and 12, journaled in and between the upper ends of the brackets 58 is a shaft 75, fast on each end of which, between the two limbs of each bracket 58, is an eccentric 76. Mounted on and suspended from the eccentric 76 is a link 77, the lower end of which is pivoted at 78 to the arm 59 approximately mid-length of the latter. The links 77 thus normally maintain the arms 59 rigidly in a substantially horizontal position, as shown in Fig. 12. Mounted on a pillow block 79 (Figs. 6 and 8) in turn supported on the bracket 46 is a quick-release electric motor 81, which, through a speed reducer 82, operates a gear fast on shaft 75. In practice, the motor 81 is wired to a push button or other switch within convenient reach of the attendant of the machine so that, when the stock is shut off, the motor 81 is energized for a sufficient period to turn shaft 75 and rock the eccentric 76 upwardly through approximately ninety degrees, and this effects a quick raising of the nozzle plate and its manual operating mechanism to substantially the dotted line position indicated in Fig. 12, wherein the lower free edge of the nozzle plate 53 is free of tensional drag thereon by the wire.

Top nozzle plate end seals

In order that a minimum amount of water need be removed after the stock emerges from the inlet, the machine is operated with the lower edge of the top nozzle plate 53 so close to the wire that it almost touches the mat. This is best illustrated in Fig. 12. Due to the high pressure of the stock against the wire, the latter sags considerably between the breast roll and the first table roll, so that the free edge of the upper nozzle plate is normally considerably below a straight line tangent to the tops of these two rolls. As a result of operating in the manner above indicated, and because of the above mentioned sag in the wire, it is necessary to have effective seals at the side ends of the upper nozzle plate to prevent the stock squirting out at these points when the wire is under pressure, and to exert equal pressure on that section of the wire at the edge outside the inlet. These seals are in the general nature of rubber shoes that are attached to the side edges of the top nozzle plate and, of course, move with the latter.

Figure 13:
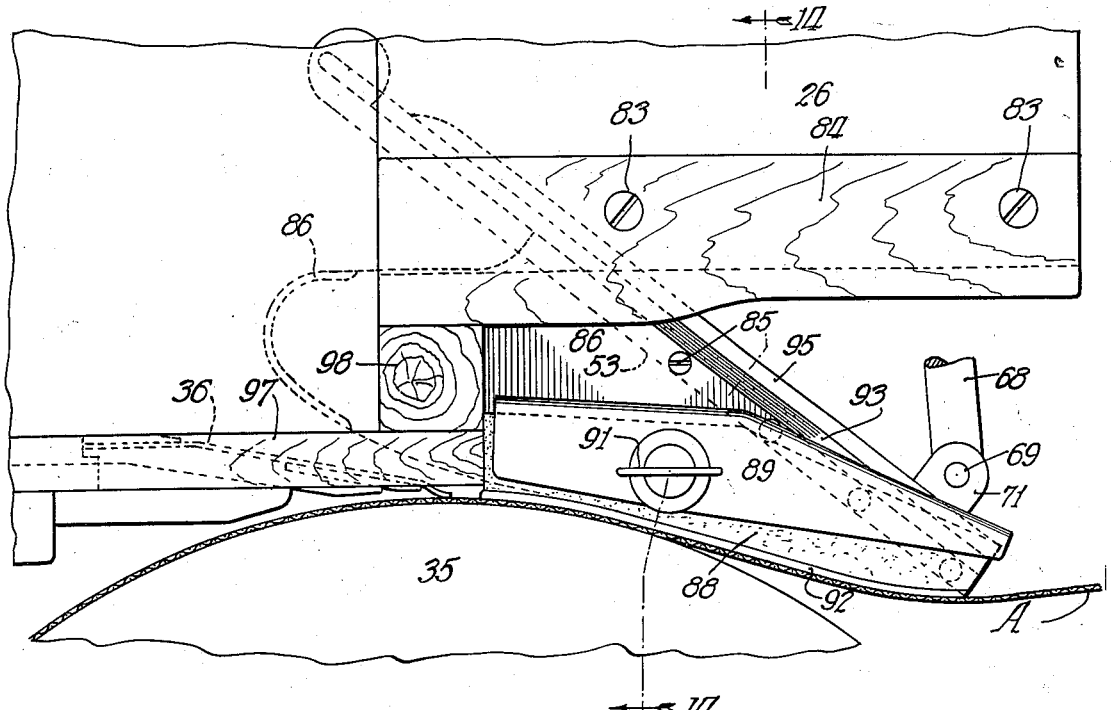
Fig. 13 is an enlarged side elevation of one of the end seals of the top nozzle plate.
Figure 14:
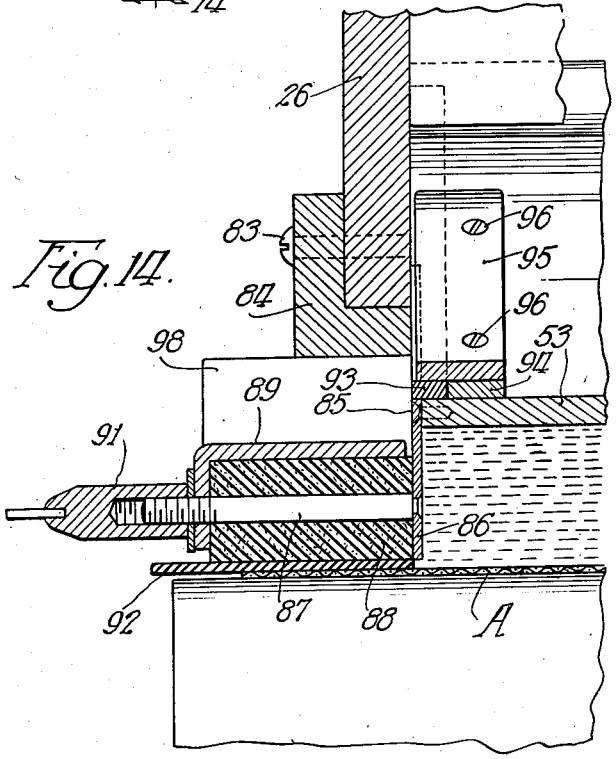
Fig. 14 is a vertical transverse section on offset line 14—14 of Fig. 13.

The preferred structural details of these end seals are best shown in Figs. 13 and 14. As shown in Fig. 5, the side plates 26 extend forwardly opposite the ends of the top nozzle plate substantially to the free end of the latter, and to the lower edge of each side plate extension is attached as by screws 83 an angle bar stiffening strip 84. Attached to each end edge of the nozzle plate 53 as by screws 85 is a depending metal plate 86, the lower edge of which conforms to the normal curve of the depressed portion of the wire and lies slightly above the latter. The rear portion of the plate 86 extends across the inner edge of the stiffening bar 84 and a portion of the inner surface of the wall 26 and preferably has the rear end formation indicated by dotted lines in Fig. 13. Mounted in and extending on the outer side of the plate 86 is a rod 87, on which is mounted a block 88 of sponge rubber, and a clamp 89 of inverted L-shape in cross section. The outer end of the rod 87 is threaded to receive a clamp nut 91, by the turning up of which the sponge rubber block 88 is compressed sidewise and caused to expand in a downward and forward direction. The sponge rubber block 88 is preferably shod with a live rubber sole 92 that has a relative wiping contact with the Fourdrinier wire, thus forming a seal against escape of water edgewise of the wire at the inlet discharge. The joint between the plate 86 and the nozzle plate 53 is also sealed by a rubber strip 93 overlying the joint on the upper side of the nozzle plate 53 and secured in place by a spacing strip 94, a clamp strip 95, and screws 96. Between the rear end of the strip 84 and a guard rail 97, which flanks the end edge of the stationary lower lip or nozzle plate 36, is secured a wooden block 98 which forms an end abutment for the sponge rubber block 88, thus limiting endwise expansion under lateral compression of the block to a forward direction, and also cooperates with the strip 84 and the guard rail 97 in forming a lateral abutment or support for the metal plate 86 to prevent outward spread of the latter under the pressure of the stock flowing past the same.

The above described seal we have found very effective to prevent lateral escape of the flowing stock as it is discharged onto the wire at and beyond the breast roll, and as it does not extend beyond the lower edge of the top nozzle plate, it avoids the formation of ripples of water on the wire such as is caused by deckle straps that injure the wet surface formation.

We may here remark that, in order that for any given setting of the inlet with respect to the breast roll, the greatest amount of water will be removed before the stock emerges from the inlet, we have found it highly advantageous to elevate the first and second table rolls considerably above horizontal, as is shown in Figs. 1, 5, 7 and 12, the second roll being preferably slightly higher than the first. This is due to the fact that because of the catenary of the wire under the enormous pressures which are exerted upon it when the machine is operating at a high head, a portion of the surface of the wire between the center line of the breast roll and the free edge of the upper nozzle plate is not available for free drainage because it wraps on the breast roll. By elevating the first table roll we lift the wire away from the breast roll, which is quite important. Moreover, we preferably lower the wire gradually toward the couch roll by locating the table rolls beyond the second at a progressively lower elevation, as indicated in Fig. 1. There is a further advantage in this incline and decline of the wire, because it increases the wrap of the wire on the first table roll.

Distributor roll

Machines of this type, if desired, may be equipped with a rotary perforated distributor roll extending across the flow duct in rear of the discharge nozzle to effect a uniform dispersion of the fibers in the flowing body of water, and the most efficient position of this roll may vary with the pressure and speed of flow, and the consistency and other operating conditions of the stock. Hence, it is desirable to provide means for adjusting the position of this roll. Accordingly we have shown a double eccentric mounting for the end spindles of the roll by which the latter can be bodily adjusted horizontally or vertically, or in a combined horizontal and vertical direction. The details of this mounting are best shown in Figs. 15, 16, 17 and 18, and referring thereto 99 designates an annular boss on each side wall 26 in which is mounted by a drive fit a bushing ring 101. Within the hollow boss 99 is the hollow hub 102 of an outer eccentric ring 103, which ring has a bearing in the bushing ring 101. This outer eccentric ring 103 is formed with an internal transversely concave annular bearing face 104 in which is fitted a fiber bearing ring 105 formed with a spherical outer face; and rotatably mounted in the bearing ring 105 is an inner eccentric 106. In the normal position of the two eccentrics their eccentricities are diametrically opposed, as shown in Figs. 15 and 16.

107 designates the distributor roll, and 108 one of the trunnions thereof, which is journaled in the inner eccentric 106 through the intermediary of a fiber bushing 109 and a stuffing box 111. 112 designates a locking ring that fits within the hollow hub 102 of the outer eccentric, and is formed with an internal transversely concave surface 113 that fits the convex surface of the spherical bearing ring 105. The locking ring 112 is forced inwardly and locked in place by a plurality of threaded studs 114 that, as shown in Fig. 18, extend through holes in the locking ring 112 and into tapped sockets 115 formed in the outer eccentric 103. 116 designates a flanged cover plate that is secured to the outer face of the annular boss 99 by a plurality of screws 117 (see Fig. 18). The cover plate 116 also bears against the outer end of the hub 102 of the outer eccentric, and in the upper portion of the cover plate 116, and in an opposed socket in the boss 99 is journaled a short shaft 118 carrying a pinion 119 that meshes with a circular rack 121 on the eccentric hub 102 and is formed with a squared outer end for the application of a wrench. Attached to the lower portion of the locking ring 112 is a bracket 122 in which, and in an opposed socket in the locking ring is journaled a shaft 123 carrying a pinion 124 meshing with a gear rack 125 on the inner eccentric 106 and formed with a squared outer end for the application of a wrench.

If it is desired to shift the roll trunnion 108 in a combined upward and forward or upward and rearward direction, this may be accomplished by partially turning the inner eccentric 106 alone. If it be desired to shift the trunnion in a downward and forward or downward and rearward direction, this may be accomplished by shifting the outer eccentric alone. If it be desired to shift the roll trunnion horizontally in either direction, this may be accomplished by first turning one of the eccentrics which shifts the axis of the trunnion in an inclined direction, and then turning the other eccentric to thereby restore the axis to its former horizontal plane; and, by a similar successive turning of the two eccentrics the axis of the trunnion may be shifted to a vertical direction only. The double eccentric mounting above described thus makes it possible to shift the trunnions of the distributor roll to any desired position within the range afforded by the eccentrics. The purpose of the spherical bearings of the inner eccentric in which the roll trunnion is journaled is to permit successive adjustments of the two trunnions without imposing any bending strain on either the trunnions or their bearings.

Fig. 17 illustrates a simple gauge by which the desired vertical or horizontal adjustment of the roll spindle may be determined. The two upper fastening studs or screws 117 are provided with extensions 117' reduced at their outer ends to receive and support a horizontal scale bar 126, slidable on which is a sleeve 127, to the upper side of which is secured a pointer 128 overlying the scale on the bar 126, the sleeve 127 being secured in adjusted position by a clamp screw 129. From the under side of the sleeve 127 depends a vertical scale bar 131, on which is slidably mounted a sleeve 132, to the outer side of which is secured a pointer 133, the sleeve 132 being fastened in set position by a clamp screw 134. Also secured to one side of the sleeve 132 is a horizontal gauge bar 135 that is tangent to the top side of the spindle 108.

By the last described device the extent of vertical, horizontal or oblique shift imparted to the roll spindle is known.

A simple means for driving the distributor roll that permits a bodily adjustment of the roll is shown in Figs. 5, 6, 7 and 9, and comprises the following.

136 designates an electric motor that is mounted in a yoke 137 pivoted at 138 to an upwardly extending ear on one of the side plates 26. The motor shaft carries a sprocket wheel 139 drivingly connected by a sprocket chain 141 to a sprocket wheel 142 fast on the rear trunnion 108 of the distributor roll. Since the shifting of the distributor roll bodily necessitates either a shortening or lengthening of the sprocket chain 141 or else a shifting of the drive sprocket 139, the yoke 137 is supplied with means for swinging it up or down and locking it in set position. This means is best shown in Figs. 7 and 9 wherein it will be seen that the free end of the yoke 137 enters a vertical slot 143 in the upper end of a bracket 144 that is attached to the outer side of one of the side walls 26, and through the lower portion of said bracket extends an adjusting screw 145 that at its upper end abuts against the lower edge of the yoke 137. Manifestly, by turning the adjusting screw 145 in one direction or the other, the yoke 137 and the motor carried thereby are raised or lowered, and when the desired tension of the sprocket chain is reached, the yoke is secured in adjusted position by a set screw 146.

*Air vent*

When starting up, the flow duct of the inlet is of course filled with air, most of which is preliminarily driven off through the discharge nozzle, but some of which becomes trapped in the upper curved part of the goose-neck, and this air is vented to the atmosphere through a plurality of upstanding pipes 147 in the top wall of the duct that communicate with a horizontal pipe 148 through which the trapped air is vented to the atmosphere. As soon as the air has been discharged, the pipe 148 is closed by a valve 149 therein (Fig. 6), by opening which valve test solutions may also be drawn off from time to time.

To facilitate access to the interior of the inlet spout, the side walls 26 are formed with manhole openings 151 (Fig. 9) normally closed by cover plates 152 suitably packed and secured in place by clamps 153, the covers 152 being supplied with handles 154.

*Inlet adjusting means*

The entire stock inlet, constructed and equipped substantially as above described, is bodily movable on the side frames 25 and cross beam 33 by the following described mechanism.

Referring to Figs. 5, 6, 7, 9 and 10, 155 designates each of a pair of hollow castings that are secured to the rear top portion of the side frames 25, and are internally threaded to receive threaded rods 156. Each of these rods 156 extends through and is journaled within the hollow outwardly extending limb of an angle bracket 157 that is secured to the side wall 26 on the outer side of the latter. Fast on the rod 156 is a worm wheel 158 that, as best shown in Fig. 9, is drivingly engaged by a worm 159 fast on each end of a transverse shaft 161 and is also journaled at its ends in the brackets 157. The shaft 161 is intermediately supported by bearings 162 formed as part of brackets 163 that are mounted on the outer sides of the frames 38, and the shaft 161 has fast thereon a nut 164 that is engaged by a box wrench 165 suspended from the rod 161. A long handle 165' on the box wrench enables the same to be readily applied to the nut 164 and by turning the latter in one direction or the other, the threaded rods 156 are caused to turn in their stationary nuts 155, thereby bodily adjusting the inlet forwardly or rearwardly, so as to cause the upper nozzle plate 53 to overhang the wire beyond the breast roll to a greater or less extent. By reason of the worm and worm gear drive, the latter is self-locking in any set position.

*Table rolls*

For supporting the wire between the breast roll and the first suction box we preferably employ one or more open-surface wire table rolls designated as an entirety by 166 (Fig. 1), and one or more solid-surface tubular table rolls 167 that are driven at a peripheral speed approximating or exceeding the linear speed of the wire, and in association with both sets of rolls we employ a novel water doctor for removing water from the under side of the wire just in advance of each roll, and in association with the driven rolls we also preferably employ a wiper for removing water from the surface of the roll.

The structural features of one of the open-surface wire table rolls 166 are shown in Figs. 24 to 27. The surface-supporting core of the roll includes a series of heavy round wire helicals 231. These helicals at intervals are seated in notches 233 in the outer peripheral edge of a flat ribbon truss spiral 234 lying within the helicals 231. Extending lengthwise of the roll tangent to and supported by the truss spiral 234 and the helicals 231 are a large number of thin, flat parallel bars 235, the outer edges of which have narrowly spaced notches 236 that seat the surface member of the roll consisting of a closely wound flat ribbon wire helix 237, the pitch of which is so low that its coils are approximately at right angles to the axis of the roll, as shown in Fig. 24. In the ends of the roll are inserted spiders 238 carrying the roll trunnions 239. As shown in Fig. 24, the rim of the spider lies within and supports the end portions of the circular group of longitudinal bars 235, and on each end portion of the roll is applied a thin annular guard member 240 presenting a solid or imperforate surface substantially flush with the surface of the helix 237, which supports the edge of the Fourdrinier wire to prevent said edge from turning down in the space between adjacent turns of the helix 237 and becoming damaged by the screw action of the rotating roll. This open surface wire table roll forms the subject-matter of a divisional application filed by us November 3, 1938, Serial No. 238,528.

The driven roll 167 is simply the ordinary tubular table roll formed with a solid or imperforate surface. The rolls 167 are preferably approximately 10 inches in diameter, and the open surface rolls 16 are approximately 12 inches in diameter.

*Wire water doctor*

Another important feature of the present machine is the wire water doctor that is associated with each of the open and solid rolls above described.

The preferred structure of this water doctor is illustrated in Figs. 5, 19, 20 and 21, wherein 171 designates a screw threaded post that is mounted in a base block 172 that in turn rests on an undercut grooved rail 173 on the side frame member 174 of the table, the block 172 being adjustable on and lengthwise of the rail 173 and secured in adjusted position by clamp bolts 175. 176 designates a sleeve slidably mounted on the post 171, and adjustable up and down thereon by nuts 177 and 178. On each sleeve 176 is formed a split bearing 179. The body of the doctor, as shown in Fig. 21, is a hollow casting having a generally funnel shape, the front and rear walls of which are designated by 181 and 182 respectively, and the side walls by 183. To the outer sides of the side walls are secured, by machine screws 184, plates 185 having on their outer sides trunnions 186 engaged with the split bearings 179. On the front and rear top edges of the body of the doctor are mounted stainless steel doctor blades 187 and 188, that form an acute angle with the portions of the wire beyond them, and the upper edges of which blades are beveled to substantially fit the under surface of the wire. The split bearing 179 is formed with lateral ears or lugs 189 and 191. In the ear 189 is fixed a threaded rod 192 that extends through the ear 191 and is equipped with a clamp nut 193 having a handle 194. Fast on one of the trunnions 186 is a handle 195.

By loosening the clamp bolts 175, the doctor is bodily adjusted horizontally to the desired position in front of the roll, and a rough adjustment of the doctor to the wire is effected by raising or lowering the sleeves 176. Angular adjustment to cause the blades 187 and 188 to conform to the angle of the wire is effected by first backing off the nuts 193 to release the grip of the split bearings 179 on the trunnions 186, then, by means of the handle 195, adjusting the doctor to the correct angle relatively to the wire, and then retightening the nuts 193.

This water doctor, and particularly the first one after the inlet, removes a very large amount of water from the wire. We have found by experience that the top of this doctor must be parallel to the wire, which is readily effected by the angular adjustment above described, and that the blades and particularly the front blade must be at such an angle to the wire that the water will not be thrown up through the wire by impact. If these water doctors were not employed there would be too much disturbance of the sheet as the wire passed over the table rolls, because the water on the under side of the wire would tend to be pushed back up through the latter, thus disturbing the fibrous layer or matter on the wire. This wire water doctor forms the subject-matter of a divisional application filed by us May 11, 1940, Serial No. 334,512.

*Solid roll wiper*

As stated above, the solid rolls 167 may be operated at a peripheral speed in excess of the linear speed of the wire, so that they accomplish a wiping action which removes a considerable amount of water from the meshes of the wire as the latter passes over the roll. High speed rolls of this character are broadly old and known, but we have found that a large portion of the water wiped off the wire by the roll tends to cling to the surface of the roll, and we have therefore provided each high speed roll with a wiper which prevents it from throwing water back up into the wire on the approach side of the roll. This roll wiper is illustrated in Figs. 22 and 23; and referring thereto, 196 designates each of a pair of uprights that are footed on and adjustable lengthwise of the rails 173 in the same manner as the threaded posts 171 of the wire doctor. On the inner side of each upright 196 is a horizontal bar 197, to the inner face of which is attached, by means of machine screws 198 a depending arm 199, the screws 198 passing through slots 201 in the upper portion of the arm 199 so as to permit a limited horizontal adjustment of the arm on its support. In and between the lower ends of the arms 199 is mounted a fixed rod 202, and loosely pivoted on this rod are collars 203, integral with which is an upwardly extending plate 204 that lies behind the lower portion of the ascending side of the roll 167 and, on the opposite side of the pivot rod 202, a counter balance angle bar 205. To the inner face of the plate 204 is attached a wiper pad 206, preferably of rubber, the working face of which is preferably slightly concave to fit the periphery of the roll. The counter balance bar 205 is sufficiently heavy to normally hold the pad 206 in contact with the periphery of the roll, so that as the latter rotates in the direction indicated by the arrow in Fig. 23, the film or skin of water on the surface of the roll is effectively wiped off, so that the roll is prevented from throwing water back up into the wire on its approach side. Obviously, by a correct adjustment of the supports 196 and arms 199, the most effective position of the wiper on the roll can be secured. The arms 199 are connected by a rigid truss bar 199' extending parallel with the rod 202 to prevent deflection of the latter.

*Water tray*

Another important feature of improvement in the present machine is the design of the tray B under the table rolls. This tray catches the water which pours through the inlet nozzle and drains through the wire and diverts it to one side of the machine, whence it is delivered to the underlying mixing tank C. Due to the enormous quantities of water that are handled on a machine of this type, and the fact that almost all this water flows through the wire near the breast roll, we found it quite a problem in hydraulics to efficiently handle this water.

Structural features of the tray are shown in Figs. 1, 2 and 3. By reference to Fig. 1 it will be seen that the tray is located between the top and bottom laps of the Fourdrinier wire. 207 designates the body of the tray, the bottom wall of which is at one end substantially tangent to the breast roll 35 and the main portion of which inclines transversely from the front to the rear side of the machine, as shown in Fig. 2. On approximately the front half of the bottom wall are a group of curved fins 208 and 209 arranged alternately, with the fins 208 somewhat longer than the fins 209 and convergent toward their rear ends, as shown in Fig. 3. As shown in Fig. 1, the rear half of the bottom wall of the tray, which underlies the solid high speed rolls 167, is somewhat raised above the front half, and is formed with a single curved fin 211 (Fig. 3) adjacent to the front side of the machine. The two halves of the bottom wall are connected by a vertical division wall or dam 212. On the back side of the tray and communicating with the front section of the bottom wall is a depending spout 213, best shown in Fig. 2, across which is a stream-dividing valve in the form of a tongue 214 mounted on a transverse shaft 215 extending across the side walls of the spout at the lower end of the latter, and fast on the shaft 215 is an operating handle 216, the upper end of which extends into a guide 217 and may be secured in adjusted position by a clamp screw 218, so as to hold the valve in any adjusted position.

The large stream of water flowing through the wire between the breast roll and the first table roll and just beyond the latter impinges on the bottom of the tray and is broken up into a large number of streams by the curved fins 208 and 209 and deflected by them toward the down spout 213. The principal advantage of these fins is that they check excessive surging and lateral overflow of the water. A much less volume of water falls from the wire and high speed rolls into the rear half of the tray, and this water, directed by the fin 211, flows down the rear section of the bottom wall and over the dam 212 to the discharge spout 213. As will be pointed out later, the underlying mixing tank is interiorly divided by a transverse partition, on one side of which the bulk of the water flows, and on the other side of which a minor portion of the water is returned to the showers or sprays; the relative amounts of water thus divided being determined by the position of the valve 214. As shown in Fig. 1, the tray is also extended beneath the usual suction boxes 219 and substantially to the couch roll 221.

*Mixing tank or well*

The mixing tank C, which underlies the Fourdrinier wire and the tray last described, is shown in Figs. 1, 2 and 4 and consists of a rectangular body 222, the interior of which is divided by longitudinal partitions 223 and curved end walls 224, so as to form a zigzag flow passage as clearly shown in Fig. 4.

This division of the interior of the tank to form the zigzag flow passage is for the purpose of maintaining a continuous and uniform flow of all the stock solution in the tank from the inlet to the outlet of the latter and thus maintain the mixture at a substantially uniform percentage, and prevent the presence of substantially quiescent or dead areas of the liquid in the tank which would manifestly interfere with the uniform consistency of the solution, and also to provide time for the settling of heavy impurities and the rising of foam.

The rear limb of this flow passage is divided transversely by a partition wall 225 that directly underlies the hinge 215 of the valve 214. The larger portion of the liquid flows into the mixing tank at the left of this partition, viewing Fig. 4, and the smaller portion flows to the right, as indicated by arrows. To the larger portion of the liquid flowing through the main portion of the flow passage fresh stock is continuously added through the pipe O, and the mixture is delivered to the return pipe F through a discharge opening 226, and, by the pump E interposed in the return pipe F, is sent back to the inlet B. The minor portion of the liquid flowing to the right of partition 225, viewing Fig. 4, is discharged through an opening 227, and is pumped through pipe V to the showers 228 (Fig. 1) used for cleaning the breast roll and the underlap of the Fourdrinier wire. The liquid in the mixing tank of course contains a considerable amount of fine fiber that has escaped through the wire A, and the necessary volume of water for the showers is maintained by supply from the mixing tank, rather than from a source of fresh water, to conserve and use this fiber. Overhanging the rear end of the mixing tank is the fresh water pipe U, by which the mixing tank is originally filled with fresh water on starting up, and a constant level maintained therein.

This invention may be developed within the scope of the following claims without departing from its essential features, and the specification and drawings are to be regarded as merely illustrative and not in a limiting sense, except as necessitated by the prior art.

We claim:

1. In a paper making machine, the combination with stationary side frames, of an inlet structure comprising a pair of vertical parallel side plates directly mounted on and slidable lengthwise of said side frames, curved top and bottom plates connecting said side plates and forming with the latter a closed goose-neck spout for the inflow of stock, flexible hose connections between said spout and a source of stock supply, and means for bodily adjusting said inlet structure on and securing it to said side frames.

2. A hydraulic inlet structure for a Fourdrinier paper making machine, including a gooseneck stock flow spout bodily adjustable toward and away from the breast roll and wire, and a top nozzle plate pivotally connected to said structure beyond the top wall of said spout and normally extending a substantial distance beyond the center line of the breast roll.

3. A hydraulic inlet structure for a Fourdrinier paper making machine, including a gooseneck stock flow spout bodily adjustable toward and away from the breast roll and wire, a fixed bottom nozzle plate extending beyond the bottom wall of said spout to substantially the center line of the breast roll, and a top nozzle plate pivotally connected to said structure beyond the top wall of said spout and normally extending a considerable distance beyond the center line of the breast roll.

4. In a hydraulic inlet structure for a paper making machine, the combination with a spout, and means for forcing stock therethrough under a pressure sufficient to depress the wire below a line tangent to the breast roll and the first table roll, of a pivoted top nozzle plate connected to the forward end of said spout and having its free edge normally below said tangent line, and motor operated means for effecting a quick raising of the forward edge of said plate.

5. In a hydraulic inlet structure for a paper making machine, the combination with a spout, and means for forcing stock therethrough under a pressure sufficient to depress the wire below a line tangent to the breast roll and the first table roll, of a pivoted top nozzle plate connected to the forward end of said spout and having its free edge normally below said tangent line, manually operated means for adjusting the forward edge of said plate toward and from the wire, and motor operated means acting through said manually operated means for effecting a quick raising of the forward edge of said plate.

6. In a hydraulic inlet structure for a paper making machine, the combination with a flow box, of a bracket attached to the front wall of said flow box, a pair of fiber strips secured to the lower edge of said bracket formed in their opposed faces with bearings, and an upper nozzle plate having on its upper edge a brass pintle seated in and between said bearings.

7. In a hydraulic inlet structure for a paper making machine, the combination with a flow box, of a bracket attached to the front wall of said flow box, said bracket formed on its lower edge with a depending rib, a pair of fiber strips disposed respectively on opposite sides of and extending below said rib and formed in their opposed faces below said rib with bearings, means for clamping said fiber strips to said rib, and an upper nozzle plate having on its upper edge a brass pintle seated in and between said bearings.

8. In a hydraulic inlet for a paper making machine, the combination with a top nozzle plate, of end seals therefor comprising rubber blocks attached to the end edges of said plate, said blocks extending rearwardly of said plate and normally engaging with the edge portions of the wire.

9. In a hydraulic inlet for a paper making machine, the combination with a top nozzle plate, of end seals therefor comprising soft rubber blocks attached to the end edges of said plate, said blocks extending rearwardly of said plate and normally engaging with the edge portions of the wire, and means for laterally compressing said blocks.

10. In a hydraulic inlet for a paper making machine, the combination with a top nozzle plate, of end seals therefor comprising sponge rubber blocks attached to the end edges of said plate and extending rearwardly thereof, means for laterally compressing said blocks, and live rubber soles on said blocks normally in relative wiping contact with the edge portions of the wire.

11. In a hydraulic inlet for a paper making machine, the combination with a top nozzle plate, of plates secured to the end edges of said nozzle plate and extending rearwardly thereof, rods mounted on the outer sides of said plates, rubber blocks mounted on said rods, and means for locking said blocks on said rods.

12. In a hydraulic inlet for a paper making machine, the combination with a top nozzle plate, of vertical plates secured to the end edges of said nozzle plate and extending rearwardly thereof, horizontal rods mounted on the outer sides of said plates, said rods having threaded outer ends, sponge rubber blocks mounted on said rods, clamps slidable on said rods and engaging the tops and outer sides of said blocks, clamp nuts on the threaded ends of said rods, and live rubber soles on said blocks normally in relative wiping contact with the wire.

13. In a paper making machine of the Fourdrinier type, the combination with the breast roll, couch roll, and wire, of an intermediate table roll next beyond the breast roll the top of which is higher than the top of the breast roll, and an inlet having a top nozzle plate projecting beyond the center line of the breast roll with its free edge normally below a line tangent to the tops of said breast roll and table roll.

14. In a paper making machine of the Fourdrinier type, the combination with the breast roll, couch roll, and wire, of an intermediate table roll next beyond the breast roll the top of which is higher than the top of the breast roll, and an inlet having a bottom nozzle plate extending to substantially the center line of the breast roll and adapted to deliver the stock tangent to the latter, and a top nozzle plate projecting a substantial distance beyond the center line of the breast roll with its free edge normally below a line tangent to the tops of said breast roll and table roll.

WILLIAM R. KELLETT.
HARRY M. OSTERTAG.